US008468253B2

(12) United States Patent
Guzman et al.

(10) Patent No.: US 8,468,253 B2
(45) Date of Patent: Jun. 18, 2013

(54) METHOD AND APPARATUS FOR MULTIMEDIA COLLABORATION USING A SOCIAL NETWORK SYSTEM

(75) Inventors: Carlos Guzman, Somerset, NJ (US); Sanjay Agraharam, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 221 days.

(21) Appl. No.: 12/326,563

(22) Filed: Dec. 2, 2008

(65) Prior Publication Data

US 2010/0138492 A1 Jun. 3, 2010

(51) Int. Cl.
*G06F 15/16* (2006.01)
*G06F 3/00* (2006.01)
*H04L 12/16* (2006.01)

(52) U.S. Cl.
USPC ........... 709/227; 709/204; 709/206; 709/207; 709/229; 370/261; 370/356; 715/752

(58) Field of Classification Search
None
See application file for complete search history.

(56) References Cited

U.S. PATENT DOCUMENTS

| | | | | |
|---|---|---|---|---|
| 6,427,132 B1* | 7/2002 | Bowman-Amuah | ............ | 703/22 |
| 7,031,700 B1* | 4/2006 | Weaver et al. | ................ | 455/420 |
| 7,436,785 B1* | 10/2008 | McMullen et al. | ........... | 370/261 |
| 7,624,188 B2* | 11/2009 | Koskelainen | ................ | 709/229 |
| 2002/0076025 A1* | 6/2002 | Liversidge et al. | ...... | 379/202.01 |
| 2003/0037110 A1* | 2/2003 | Yamamoto | .................... | 709/204 |
| 2004/0003046 A1* | 1/2004 | Grabelsky et al. | ........... | 709/206 |
| 2004/0058698 A1* | 3/2004 | Crockett et al. | .............. | 455/518 |
| 2004/0179092 A1* | 9/2004 | LaPoint | ..................... | 348/14.08 |
| 2004/0203903 A1* | 10/2004 | Wilson et al. | ............... | 455/456.1 |
| 2005/0004982 A1* | 1/2005 | Vernon et al. | .................. | 709/204 |
| 2005/0198125 A1* | 9/2005 | Macleod Beck et al. | ..... | 709/204 |
| 2005/0210387 A1* | 9/2005 | Alagappan et al. | ........... | 715/700 |
| 2005/0262201 A1* | 11/2005 | Rudolph et al. | ............. | 709/205 |
| 2006/0156209 A1* | 7/2006 | Matsuura et al. | ............. | 714/798 |
| 2006/0253444 A1* | 11/2006 | O'Toole et al. | .................. | 707/9 |
| 2007/0050448 A1* | 3/2007 | Gonen et al. | ................. | 709/204 |
| 2007/0169165 A1* | 7/2007 | Crull et al. | .................... | 725/135 |
| 2007/0172042 A1* | 7/2007 | Winikoff et al. | ......... | 379/142.05 |
| 2007/0190990 A1* | 8/2007 | Yin | ............................. | 455/414.3 |
| 2007/0192410 A1* | 8/2007 | Liversidge et al. | ........... | 709/204 |
| 2007/0239839 A1* | 10/2007 | Buday et al. | ................. | 709/208 |
| 2007/0250628 A1* | 10/2007 | Katoh et al. | .................. | 709/225 |
| 2007/0275745 A1* | 11/2007 | Owen | ......................... | 455/502 |
| 2008/0025295 A1* | 1/2008 | Elliott et al. | .................. | 370/356 |
| 2008/0028323 A1* | 1/2008 | Rosen et al. | .................. | 715/752 |
| 2008/0049922 A1* | 2/2008 | Karniely | .................. | 379/205.01 |
| 2008/0147810 A1* | 6/2008 | Kumar et al. | ................. | 709/206 |
| 2008/0186166 A1* | 8/2008 | Zhou et al. | ................. | 340/539.13 |
| 2009/0024546 A1* | 1/2009 | Ficcaglia et al. | ................ | 706/12 |
| 2009/0181649 A1* | 7/2009 | Bull et al. | ................... | 455/414.1 |
| 2011/0099270 A1* | 4/2011 | Hartman et al. | .............. | 709/224 |

* cited by examiner

*Primary Examiner* — Moustafa M Meky
*Assistant Examiner* — Ho Shiu

(57) ABSTRACT

In one embodiment, the present invention is a method and apparatus for multimedia collaboration using a social network system. In one embodiment, a method for using a social network to establish a collaborative multimedia interaction includes receiving a request from a user to establish the collaborative multimedia interaction, where the user has established the social network, and notifying one or more members of the social network of the collaborative multimedia interaction using, in some embodiments, information about the members' current or last known digital presence and a customizable set of notification rules.

15 Claims, 3 Drawing Sheets

METHOD AND APPARATUS FOR MULTIMEDIA COLLABORATION USING A SOCIAL NETWORK SYSTEM

FIELD OF THE INVENTION

The present invention relates generally to social networking and relates more particularly to collaborative multimedia interactions using a social network system.

Individuals using social network systems can communicate synchronously or asynchronously, but these systems lack integration with real-time services such as telephony, video, and data sharing. In addition, these systems lack the means to communicate with individuals who are "offline" or to reach these individuals based on their current or last known digital presences (i.e., the communication devices currently or last known to be used by the individuals).

Moreover, existing real-time services, such as instant messenger programs, are silo or niche implementations for particular market segments (e.g., Voice over Internet Protocol (VoIP) calls, personal computer-to-personal computer calls, etc.). Thus, they are limited to specific communication devices.

Thus, there is a need in the art for a method and apparatus for multimedia collaboration using a social network system.

SUMMARY OF THE INVENTION

In one embodiment, the present invention is a method and apparatus for multimedia collaboration using a social network system. In one embodiment, a method for using a social network to establish a collaborative multimedia interaction includes receiving a request from a user to establish the collaborative multimedia interaction, where the user has established the social network, and notifying one or more members of the social network of the collaborative multimedia interaction using, in some embodiments, information about the members' current or last known digital presence and a customizable set of notification rules.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is method and apparatus for multimedia collaboration using a social network system. Embodiments of the invention combine the features of a collaborative multimedia application such as a multimedia conferencing system, the data of a social network system, and the ability to locate individuals based on network usage. This allows a user to establish a collaborative multimedia interaction among members of the user's social network and to locate and engage members who may not be readily available to join a collaborative multimedia interaction.

Although the present invention is described within the context of conferencing applications, embodiments of the present invention may employ the data contained in social networks to enhance a variety of applications, including other applications in which collaborations between humans (or their avatars or virtual agents) and applications are involved (such as a multimedia collaboration for a film production).

Figure 1:
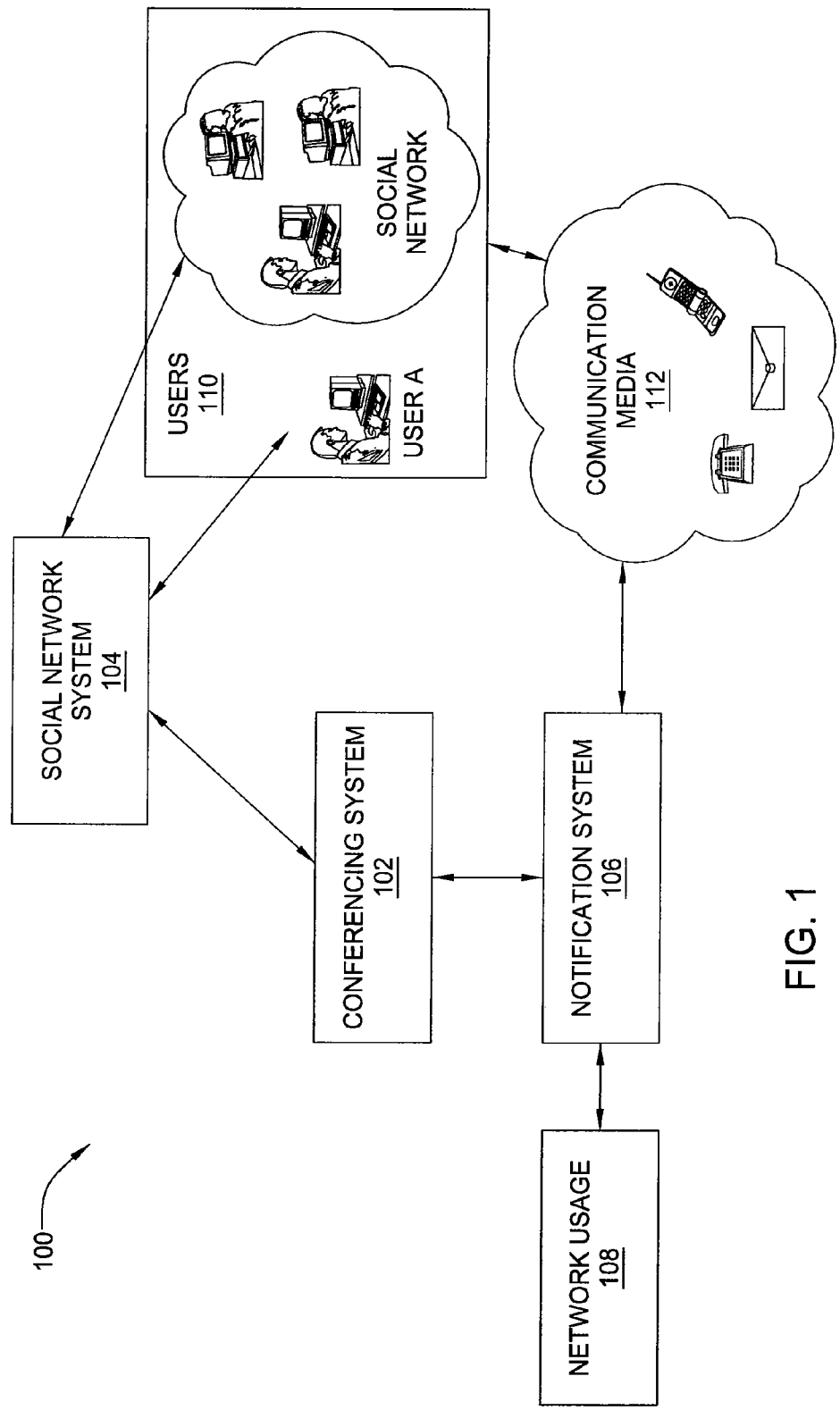
FIG. 1 is a schematic diagram illustrating one embodiment of a system for multimedia collaboration, according to the present invention.

FIG. 1 is a schematic diagram illustrating one embodiment of a system 100 for multimedia collaboration, according to the present invention. The system 100 comprises a conferencing system 102 interfaced with a social network system 104 and a notification system 106.

The social network system 104 is a system that supports social networking among its users 110. In one embodiment, the social network system 104 is a web-based application (e.g., hosted by a World Wide Web site), such as any of the well known social networking sites. The social network system 104 may, for example, allow users 110 to establish personal profiles that allow the users 110 to discover and interact with other users 110 sharing similar interests or acquaintances. To this end, the user profiles may also include contact information for the associated users 110. In a further embodiment, the social network system 104 also indicates usage information, namely, whether a given user 110 is currently using the social network system 104 (e.g., is "online" or logged in). In one embodiment, the social network system 104 is protected by a secure access system (e.g., authentication or the like).

The conferencing system 102 is a multimedia conferencing system that supports voice, video, and data services and combinations thereof on a scheduled or ad hoc basis. As discussed above, the conferencing system 102 is interfaced with the social network system 104, allowing the conferencing system 102 to retrieve social network data from the social network system 104, as discussed in greater detail below. In a further embodiment, the conferencing system 102 supports data content delivery (e.g., bi-directional or uni-directional). The data content may, for example, be associated with the context of a conference session or may be unsolicited (e.g., advertising). In a further example, the data content is based on social network profiles of the users 110, the location of the social network system 104, or both.

The notification system 106 is also interfaced with the conferencing system 102 and is configured to notify users 110 of events (e.g., when they have been invited to join a conference supported by the conferencing system 102), as discussed in greater detail below. In one embodiment, the notification system 106 is a rules based system that controls not only which users 110 are notified, but also how those users 110 are notified (i.e., which communications media 112 to use to notify the users 110) and when those users 110 are notified. These rules can be inferred by the system 100 (e.g., the network usage module 108 indicates that a user is currently using the Internet, so the system 100 notifies him/her by email or instant message), configured by the users 110, or both. In one embodiment, the rules are specific to the location of the social network system 104 (e.g., domestic vs. international) and are based on at least one of the following: language, time zone(s) of the users 110 (e.g., don't call at night), and local culture (e.g., greetings).

The notification system 106 is further interfaces with a network usage module 108. The network usage module 108 provides usage information about the communication device (s) used by the users 110 of the system 100. These devices may include, for example, wireless and landline telephones, personal digital assistants, global positioning systems (GPS), gaming devices, desktop and laptop computers, and the like. As discussed in further detail below, this information may be used by the notification system 106 to determine the best way of reaching a user 110.

Figure 2:
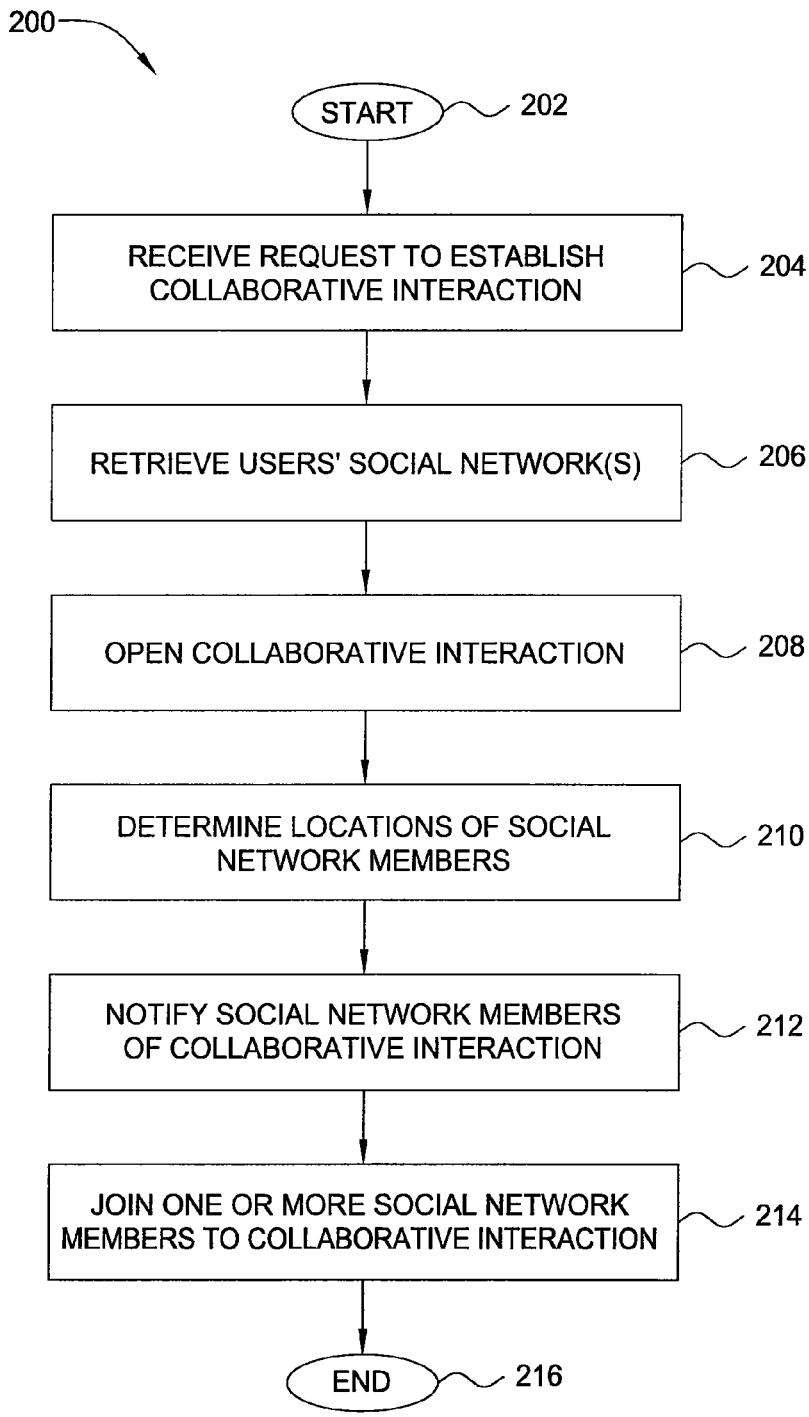
FIG. 2 is a flow diagram illustrating one embodiment of a method for multimedia collaboration according to the present invention.

FIG. 2 is a flow diagram illustrating one embodiment of a method 200 for multimedia collaboration, according to the present invention. The method 200 may be implemented, for example, by the system 100 illustrated in FIG. 100 in order to establish a conference session among users 110. As such, description of the method 200 will make reference to several of the system components described above; however, it is to be understood that the method 200 is not limited to execution with the system 100.

The method 200 is initialized at step 202 and proceeds to step 204, where the social network system 104 receives a request from one or more of the users 110 to establish a collaborative multimedia interaction, such as a conference session. The request may request the participation of members of the user's social network, who may be online or offline. In one embodiment, where two or more users 110 are requesting the conference session, the request may specify that members of each of the requesting users' social networks be invited to participate in the conference session. For example, the request may be from Joe, who wants to talk to three of his friends, Mike, Larry, and Tom, but who doesn't know the best way to immediate reach his friends (e.g., landline telephone, wireless device, email, etc.). It may be the case that Mike is currently watching television using an Internet Protocol television (IPTV service); Tom is currently travelling with his wireless, GPS-enabled telephone; and Larry is browsing the Internet on his computer.

In step 206, the conferencing system 102 retrieves the requesting user's social network from the social network system 104. The retrieved information includes contact information for the members of the social network. The conferencing system 102 then opens a conference session (e.g., audio and/or video) in step 208. As discussed above, the opened conference session may include data content delivery.

In optional step 210 (illustrated in phantom), the notification system determines the active location of each invitee (e.g., "on the Internet," "on the phone," "traveling" based on global positioning system data, etc.). In one embodiment, the notification system 106 determines the locations of the invitees by consulting the network usage module 108. The information provided by the network usage module 108 may provide information about invitees' past, current, and/or future network usage.

In step 212, the notification system 106 notifies the invitees to the conference session of the invitation to join the conference session. In one embodiment, a notification is sent to one or more members of the requesting users' social network, as retrieved in step 206. In one embodiment, the location information determined in step 210 is used to notify the invitees. As discussed above, this location information may include information about invitees' past, current, and/or future network usage. For instance, information about an invitee's past network usage may be used to send the notification to the last known device that was used by the invitee. Information about an invitee's current network usage may be used to send the notification to the device currently being used by the invitee. Information about the invitee's network usage patterns may be used to send the notification to a device the invitee is expected to be using or expected to use.

In a further embodiment, notification in accordance with step 212 includes notifying an invitee via the "best" method of reaching the invitee (e.g., via personal digital assistant as opposed to via wireless telephone). The "best" method may be dictated by the invitee (e.g., in his or her user profile) or by the requesting user (e.g., in his or her address book or by manual entry). In one embodiment, a plurality of methods for reaching an invitee is prioritized or ranked (e.g., "contact me by personal digital assistant first, and if that doesn't work, contact me by wireless telephone"). In an alternative embodiment, the notification system 106 determines the "best" method based on the network usage of an invitee within the time frame of the conference session (e.g., if the invitee is currently using the Internet, send him/her an email or instant message; if the invitee is currently using a wireless telephone, send him/her a short message service communication or a voice message; if GPS data indicates the invitee is travelling, send him/her a message via his/her wireless telephone; if the invitee is at home and the conference session in voice only, call him/her on their home telephone).

In one embodiment, a notification sent to an invitee provides the invitee with a means to automatically join the conference session, if enabled by the method used to notify the invitee. For example, if the invitee is notified by telephone (wireless or landline), the notification may allow the invitee to automatically join an audio bridge. In an alternate embodiment, the notification provides the invitee with the means of manually joining the conference session. For example, if the invitee is notified by email, the email may provide instructions on how to manually join the conference session. As discussed above, a rules based system is used to determine: (1) how to notify invitees (e.g., methods, priorities, and network usage); (2) when to notify invitees (e.g., real-time, scheduled); (3) and what actions to take when sending the notification (e.g., notify only, notify and provide means for automatic joining). These rules can be inferred by the system 100 or configured by the users 110.

For example, continuing the example proposed above, the notification system 106 may notify Mike via a pop-up message on his television screen; may notify Tom via a call to his wireless telephone (in which case Tom may be automatically added to the conference session or simply advised of the conference session); and may notify Larry via an email or invocation of a conference software tool on Larry's computer. Alternatively, if Mike specifies that he does not wish to receive notification while he is watching football, the notification system may notify Mike via his landline telephone rather than his television. If Tom specifies that he only wants to be notified and automatically joined to a conference session while travelling when Joe is calling, but to receive text message notifications when anyone else is calling, the notification system may notify Tom via the call and automatic addition discussed above. If Larry specifies that he prefers for the conference software tool on his computer to start up and join him automatically in audio mode only when he is browsing the Internet, the notification system may notify Larry by automatically starting his conference software tool as discussed above.

In step 214, the conferencing system 102 joins one or more invitees to the conference session opened in step 208. Based on the method used to notify the invitees of the conference session, invitees may be joined automatically or manually as discussed above. In one embodiment, the conferencing system 102 exposes different services or features to invitees based on their position with the requesting user's social network (e.g., invitees who are directly connect to the requesting user may have access to more features than invitees who are indirectly connected to the requesting user).

The method 200 then terminates in step 216.

Embodiments of the method 200 may be used to distribute a variety of types of notifications. For example, the method 200 may be used to distribute pre-conference-session notifications advising invitees of a conference session in advance (e.g., an event invitation). Alternatively, the method 200 may be used to distribute a conference session notification advising invitees to immediately join the conference session. In yet another example, the method 200 may be used to distribute post-conference-session notifications that provide post-conference-session content to the invitees (e.g., additional information, surveys). In addition, usage patterns as indicated by the network usage module 108 may be used to build rules for pre- and post-conference-session notifications. For example, an invitee may be notified by email at 8:00 PM if the network usage data indicates that he/she is always using the Internet at that time, or the invitee may be notified by email (asynchronous method) on weekends at 9:00 AM if the network usage data indicates that he/she uses no communications devices at that time (e.g., he/she is probably sleeping).

Moreover, the system 100 and method 200 can be used to advise invitees of any type of event, and are not limited to the management of multimedia conferences.

Figure 3:
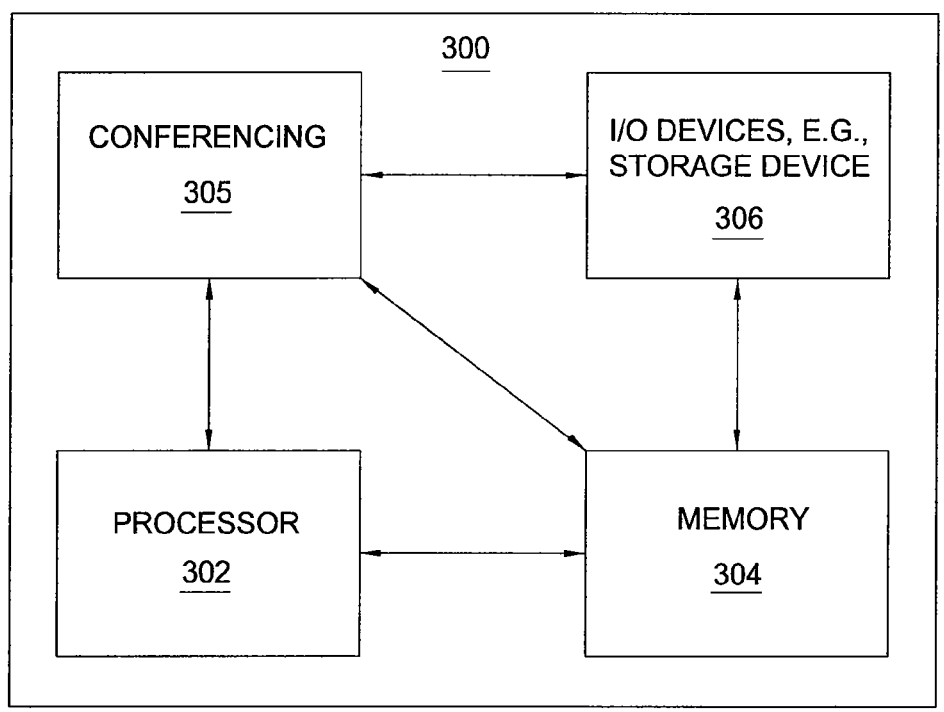
FIG. 3 is a high level block diagram of the conferencing method that is implemented using a general purpose computing device.

FIG. 3 is a high level block diagram of the conferencing method that is implemented using a general purpose computing device 300. In one embodiment, a general purpose computing device 300 comprises a processor 302, a memory 304, a conferencing module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the conferencing module 305 can be implemented as a physical device or subsystem that is coupled to a processor through a communication channel.

Alternatively, the conferencing module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the conferencing module 305 for establishing for collaborative multimedia interactions using information from social networks described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for using a social network to establish a collaborative multimedia interaction, comprising:
   notifying, by a processor, a device of a member of the social network of the collaborative multimedia interaction, wherein the collaborative multimedia interaction is established by a conferencing system in response to receiving a request from a user device to establish the collaborative multimedia interaction, wherein the social network is hosted separately from the collaborative multimedia interaction by a social network system, wherein the notifying comprises:
   retrieving contact information for the member from the social network;
   determining a physical location of the device of the member, wherein the determining the physical location is based upon a past network usage pattern associated with the member;
   determining a rule pertaining to when to notify the device of the member; and
   sending a notification in accordance with the physical location of the device of the member and in accordance with the contact information, for inviting the device of the member to join the collaborative multimedia interaction, wherein the notification is sent at a time in accordance with the rule pertaining to when to notify the device of the member, and wherein the sending comprises contacting the device of the member in accordance with a prioritized list of contact methods.

2. The method of claim 1, further comprising:
   opening the collaborative multimedia interaction in response to the request.

3. The method of claim 1, further comprising:
   joining the device of the member to the collaborative multimedia interaction.

4. The method of claim 3, wherein the joining is performed automatically.

5. The method of claim 3, wherein the joining is performed manually.

6. A tangible computer readable storage medium containing an executable program for using a social network to establish a collaborative multimedia interaction, where the executable program, when executed by a processor, causes the processor to perform operations, the operations comprising:
   notifying a device of a member of the social network of the collaborative multimedia interaction, wherein the collaborative multimedia interaction is established by a conferencing system in response to receiving a request from a user device to establish the collaborative multimedia interaction, wherein the social network is hosted separately from the collaborative multimedia interaction by a social network system, wherein the notifying comprises:
   retrieving contact information for the member from the social network;
   determining a physical location of the device of the member, wherein the determining the physical location is based upon a past network usage pattern associated with the member;
   determining a rule pertaining to when to notify the device of the member; and
   sending a notification in accordance with the physical location of the device of the member and in accordance with the contact information, for inviting the device of the member to join the collaborative multimedia interaction, wherein the notification is sent at a time in accordance with the rule pertaining to when to notify the device of the member, and wherein the sending comprises contacting the device of the member in accordance with a prioritized list of contact methods.

7. A system for using a social network to establish a collaborative multimedia interaction, comprising:
   a processor of a notification system; and
   a computer readable medium in communication with the processor, storing an executable program which, when executed by the processor, causes the processor to perform operations, the operations comprising:
      notifying a device of the member of the social network of the collaborative multimedia interaction, wherein the collaborative multimedia interaction is established by a conferencing system in response to receiving a request from a user device to establish the collaborative multimedia interaction, wherein the social network is hosted separately from the collaborative multimedia interaction by a social network system, wherein the notifying comprises:
         retrieving contact information for the member from the social network;
         determining a physical location of the device of the member, wherein the determining the physical location is based upon a past network usage pattern associated with the member;
         determining a rule pertaining to when to notify the device of the member; and
         sending a notification in accordance with the physical location of the device of the member and in accordance with the contact information, for inviting the device of the member to join the collaborative multimedia interaction, wherein the notification is sent at a time in accordance with the rule pertaining to when to notify the device of the member, and wherein the sending comprises contacting the device of the member in accordance with a prioritized list of contact methods.

8. The system of claim 7, further comprising:
   a network usage module interfaced to the notification system for providing usage information about the device of the member.

9. The system of claim 7, wherein the rule is inferred.

10. The system of claim 7, wherein the rule is configured via the user device.

11. The system of claim 7, wherein the rule is specific to a location of the social network system.

12. The system of claim 11, wherein the rule is further based on a time zone of the device of the member.

13. The system of claim 7, wherein the conferencing system further supports a delivery of data content.

14. The system of claim 13, wherein the data content is based on a profile of the user, the profile being maintained by the social network system.

15. The system of claim 7, wherein the social network system indicates usage information associated with the user and with the member.

* * * * *